(12) United States Patent
Denike et al.

(10) Patent No.: US 7,422,029 B2
(45) Date of Patent: Sep. 9, 2008

(54) LINEAR DAMPER FOR CHECK VALVE

(75) Inventors: Stuart K. Denike, Phoenix, AZ (US); Joseph J. Jira, Laveen, AZ (US); G. Stephen McGonigle, Gilbert, AZ (US); Jeremiah J. Warriner, Laveen, AZ (US)

(73) Assignee: Honeywell International Inc., Morristown, NJ (US)

( * ) Notice: Subject to any disclaimer, the term of this patent is extended or adjusted under 35 U.S.C. 154(b) by 28 days.

(21) Appl. No.: 11/529,952

(22) Filed: Sep. 29, 2006

(65) Prior Publication Data

US 2008/0078458 A1  Apr. 3, 2008

(51) Int. Cl.
- F16K 15/00 (2006.01)
- F16K 17/00 (2006.01)
- F16K 21/04 (2006.01)
- F16K 21/10 (2006.01)

(52) U.S. Cl. .................. 137/512.1; 137/514
(58) Field of Classification Search ............ 137/512.1, 137/514, 514.3
See application file for complete search history.

(56) References Cited

U.S. PATENT DOCUMENTS

| | | | |
|---|---|---|---|
| 1,487,038 A | 3/1924 | Spencer | |
| 2,578,590 A | 12/1951 | Perrault | |
| 3,098,502 A | 7/1963 | Deve | |
| 3,533,438 A * | 10/1970 | Smith | 137/512.1 |
| 4,315,524 A | 2/1982 | Hoffmann et al. | |
| 4,330,006 A * | 5/1982 | Eck et al. | 137/514 |
| 4,617,959 A | 10/1986 | Yamada | |
| 5,685,333 A * | 11/1997 | Skaryd | 137/514.5 |
| 5,769,116 A * | 6/1998 | Yokota et al. | 137/514 |
| 5,899,805 A | 5/1999 | Dowd et al. | |
| 6,073,651 A | 6/2000 | Conrads et al. | |
| 2005/0166971 A1 | 8/2005 | Arov et al. | |
| 2008/0072973 A1 * | 3/2008 | McGonigle et al. | 137/512.1 |
| 2008/0072974 A1 * | 3/2008 | Denike et al. | 137/527 |

* cited by examiner

Primary Examiner—John Rivell
Assistant Examiner—William McCalister
(74) Attorney, Agent, or Firm—Ingrassia, Fisher & Lorenz, P.C.

(57) ABSTRACT

A damping system, for a valve with a flapper movable between an open position and a closed position, comprises a main body and a piston. The main body has at least an inner wall that defines a chamber having fluid therein. The main body is coupled to the flapper, and is configured to move therewith. The piston is disposed at least partially within the chamber. The piston is configured to move within the chamber in a direction opposite the direction of movement of the main body when the flapper approaches the open position or the closed position, to thereby compress the fluid in a section of the chamber and slow movement of the main body. Movement of the flapper is thereby slowed when approaching the open position or the closed position.

20 Claims, 11 Drawing Sheets

LINEAR DAMPER FOR CHECK VALVE

TECHNICAL FIELD

The present invention relates generally to a check valve and, more particularly, to a check valve with a linear damping mechanism.

BACKGROUND

Insert style check valves are used to control air flow in a pneumatic system, and may be installed for the purpose of reducing system weight and costs. For example, the check valves may be used to replace larger, body style check valves that are in ducts of the pneumatic system. Generally, check valves operate by moving between a closed position, where the valve seals the duct and prevents air from flowing in a reverse direction, and an open position, where the valve unseals the duct and allows air flow in a forward direction. Such check valves, while generally safe, reliable, and robust, can experience some wear and/or noise, for example when the valves open and close.

Accordingly, there is a need for a check valve with reduced wear and/or noise when opening and closing. The present invention addresses at least this need.

BRIEF SUMMARY

The present invention provides a damping system for a check valve.

In one embodiment, and by way of example only, a check valve comprises a valve body, a flapper, and a damping mechanism. The valve body has an upstream side, a downstream side, and a valve flow channel that extends between the upstream and downstream sides. The flapper is rotationally mounted on the valve body, and is movable between a closed position, in which the flapper at least substantially seals the valve flow channel, and an open position, in which the flapper at least substantially unseals the valve flow channel. The damping mechanism is mounted on the flapper, and comprises a main body and a piston. The main body has at least an inner wall that defines a chamber having fluid therein. The main body is coupled to the flapper, and is configured to move therewith. The piston is disposed at least partially within the chamber. The piston is configured to move within the chamber in a direction opposite the direction of movement of the main body when the flapper approaches the open position or the closed position, to thereby compress the fluid in a section of the chamber and slow movement of the main body. Movement of the flapper is thereby slowed when approaching the open position or the closed position.

In another embodiment, and by way of example only, a check valve comprises a valve body, a plurality of flappers, and a plurality of damping mechanisms. The valve body has an upstream side, a downstream side, and a plurality of valve flow channels that extend between the upstream and downstream sides. The plurality of flappers are rotationally mounted on the valve body. Each flapper is movable between a closed position, in which such flapper at least substantially seals a valve flow channel, and an open position, in which such flapper at least substantially unseals a valve flow channel. Each damping mechanism is mounted on a corresponding flapper, and comprises a main body and a piston. The main body has at least an inner wall that defines a chamber having fluid therein, and is coupled to the corresponding flapper and configured to move therewith. The piston is disposed at least partially within the chamber. The piston is configured to move within the chamber in a direction opposite the direction of movement of the main body when the corresponding flapper approaches the open position or the closed position, to thereby compress the fluid in a section of the chamber and slow movement of the main body. Movement of the corresponding flapper is thereby slowed when approaching the open position or the closed position.

In yet another embodiment, and by way of example only, a damping system, for a valve with a flapper movable between an open position and a closed position, comprises a main body and a piston. The main body has at least an inner wall that defines a chamber having fluid therein. The main body is coupled to the flapper, and is configured to move therewith. The piston is disposed at least partially within the chamber. The piston is configured to move within the chamber in a direction opposite the direction of movement of the main body when the flapper approaches the open position or the closed position, to thereby compress the fluid in a section of the chamber and slow movement of the main body. Movement of the flapper is thereby slowed when approaching the open position or the closed position.

Other independent features and advantages of the preferred systems will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background or the following detailed description. In this regard, although the invention is described herein as being implemented in an air distribution system, it will be appreciated that it could also be implemented in any one of numerous other types of systems that direct the flow of various types of fluid, both within or apart from an aircraft, and/or any one of numerous other types of vehicles or other types of apparatus or systems.

Figure 1:
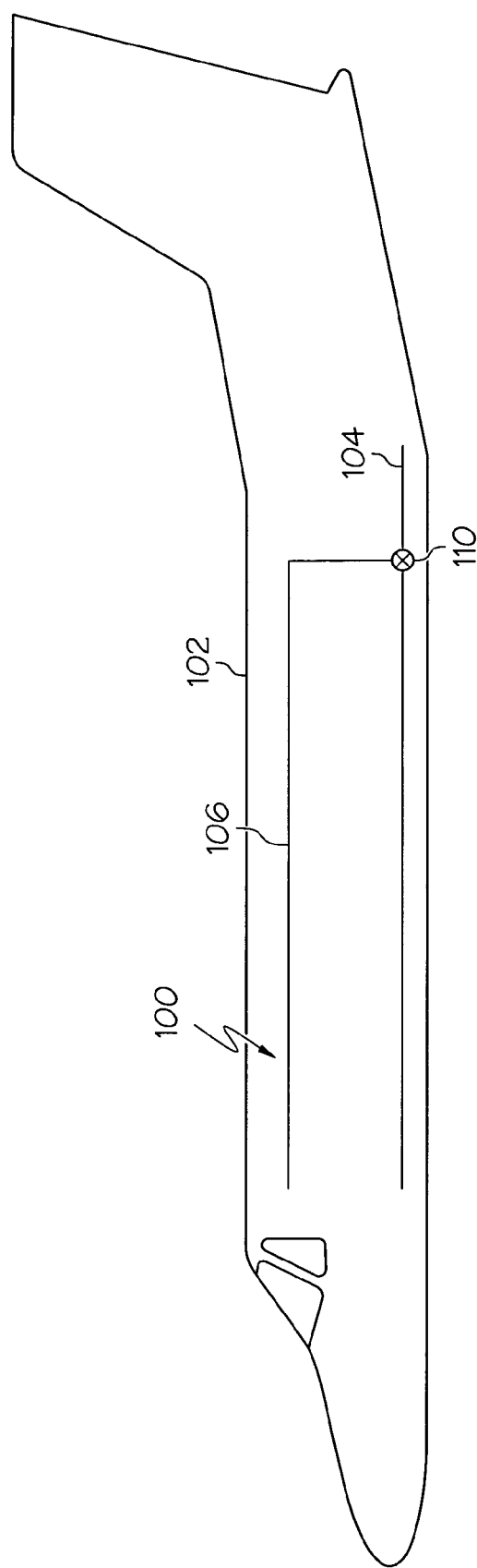
FIG. 1 is a simplified schematic diagram illustrating an air distribution system.

FIG. 1 is a simplified schematic diagram illustrating an air distribution system 100 disposed within an aircraft 102. The air distribution system 100 includes an inlet duct 104, one or more outlet ducts 106 (only one of which is shown here), and a valve 110 positioned in the duct 106. The inlet duct 104 receives air from an air source, such as, for example, engine bleed air, and the outlet duct 106 exhausts air into desired sections of the aircraft 102. In one exemplary embodiment, the outlet duct 106 exhausts air into or out of an aircraft cabin (not shown). The valve 110 is configured to control the air flow through the outlet duct 106 and to prevent the air from flowing in a reverse direction. An exemplary embodiment of the valve 110 is depicted in FIGS. 2-11, and will now be described in more detail.

Figure 2:
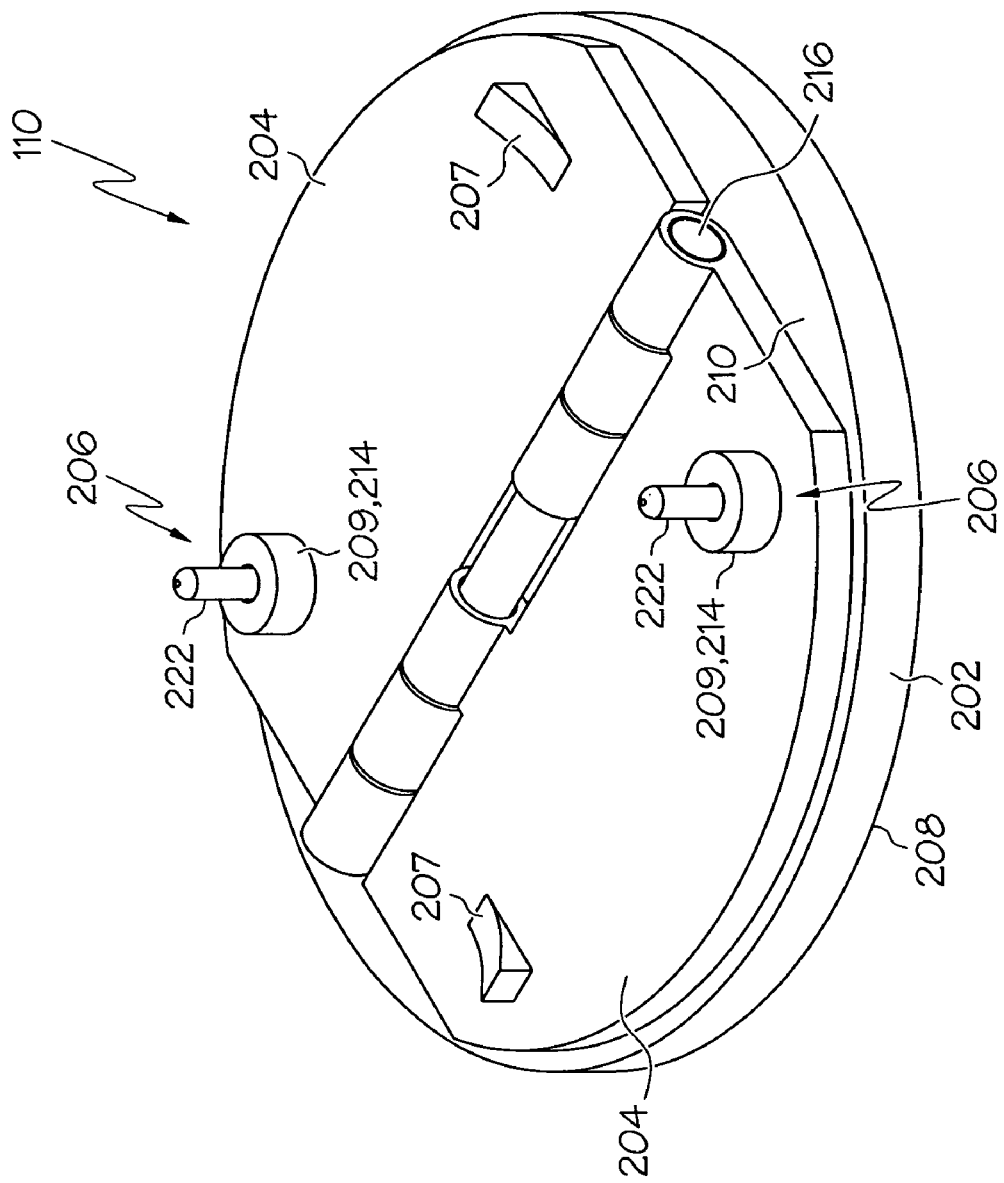
FIG. 2 provides a perspective plan view, from a downstream side and in a closed position, of an exemplary embodiment of a check valve that may be used in the system of FIG. 1.
Figure 3:
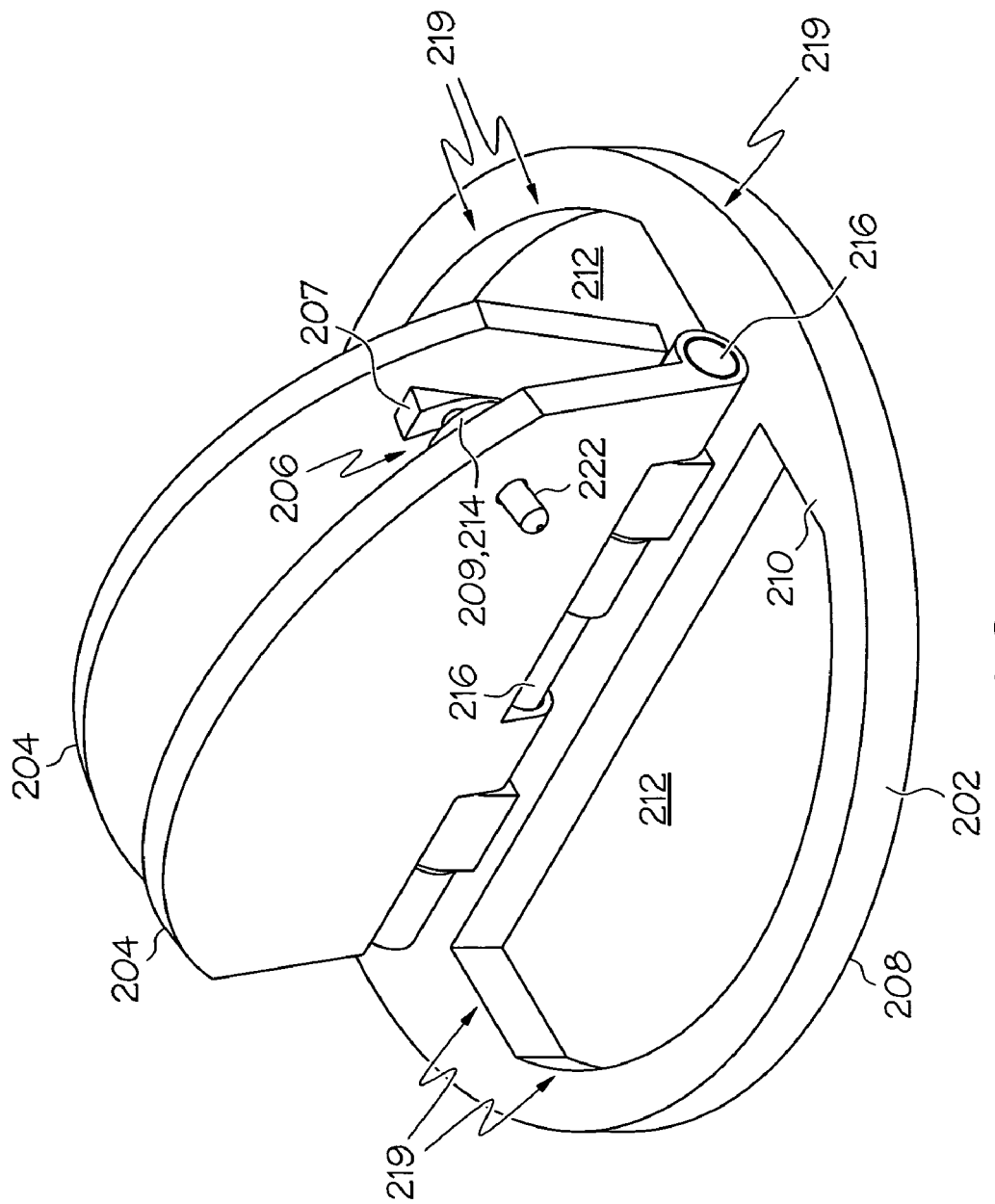
FIG. 3 provides a perspective plan view of the exemplary valve of FIG. 2, shown from a downstream side and in a fully-open position.
Figure 4:
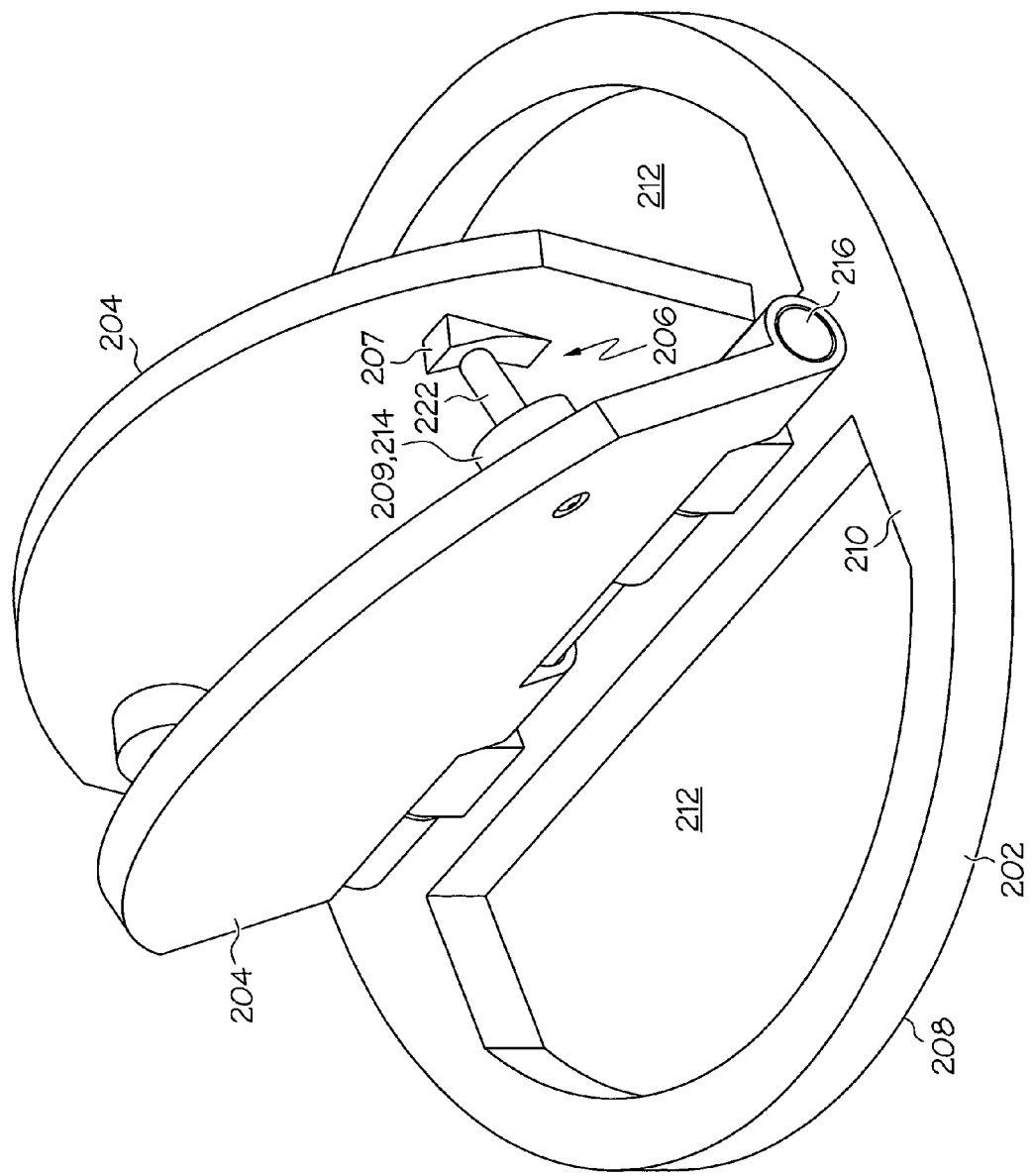
FIG. 4 provides a close-up view of a portion of the exemplary valve of FIG. 2, depicting an exemplary embodiment of a damping mechanism that can be used in the valve, and shown from a downstream side as the valve approaches a fully-open position.
Figure 5:
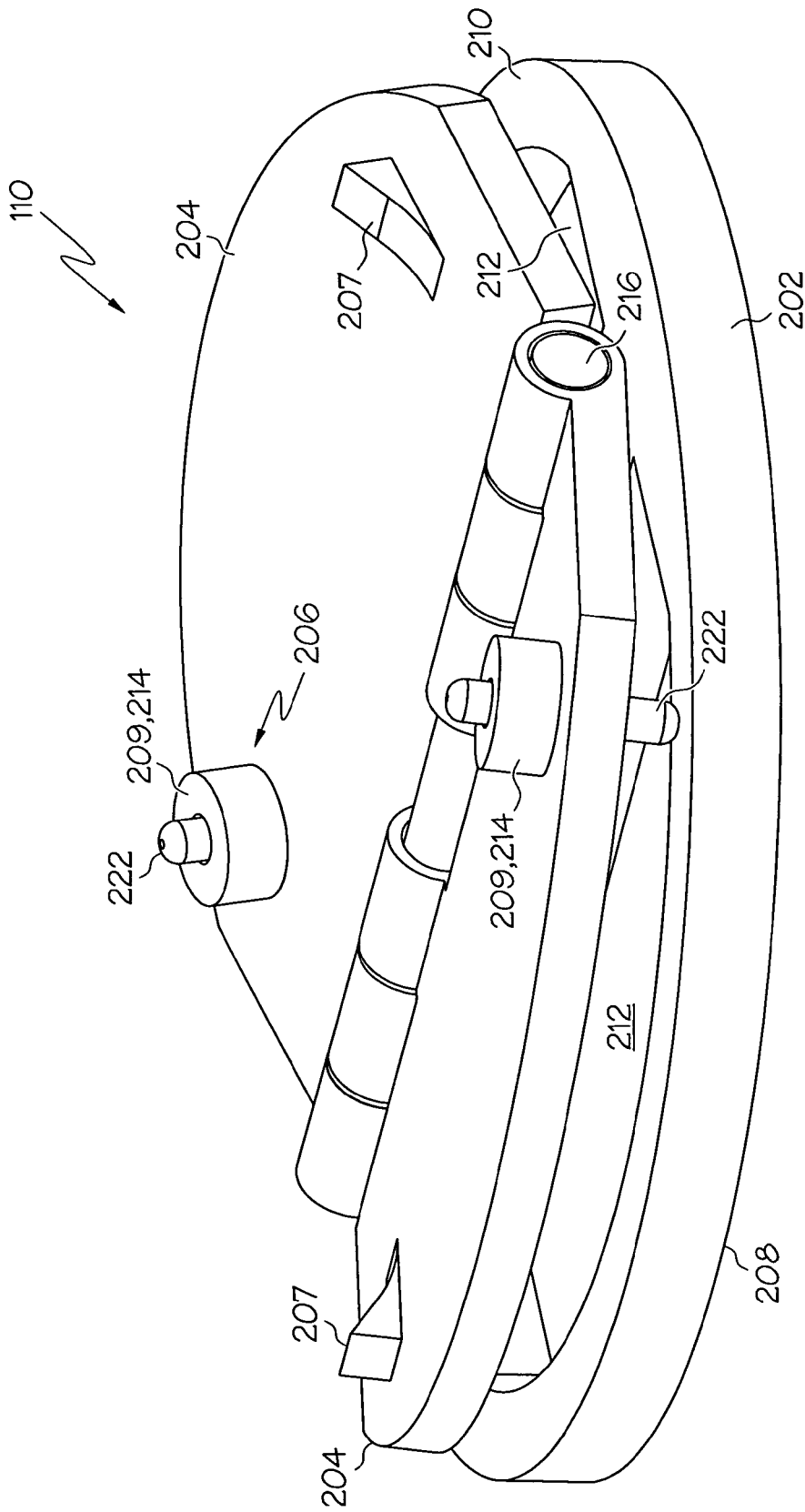
FIG. 5 provides a perspective plan view of the exemplary valve of FIG. 2, shown from a downstream side as it approaches a closed position.
Figure 6:
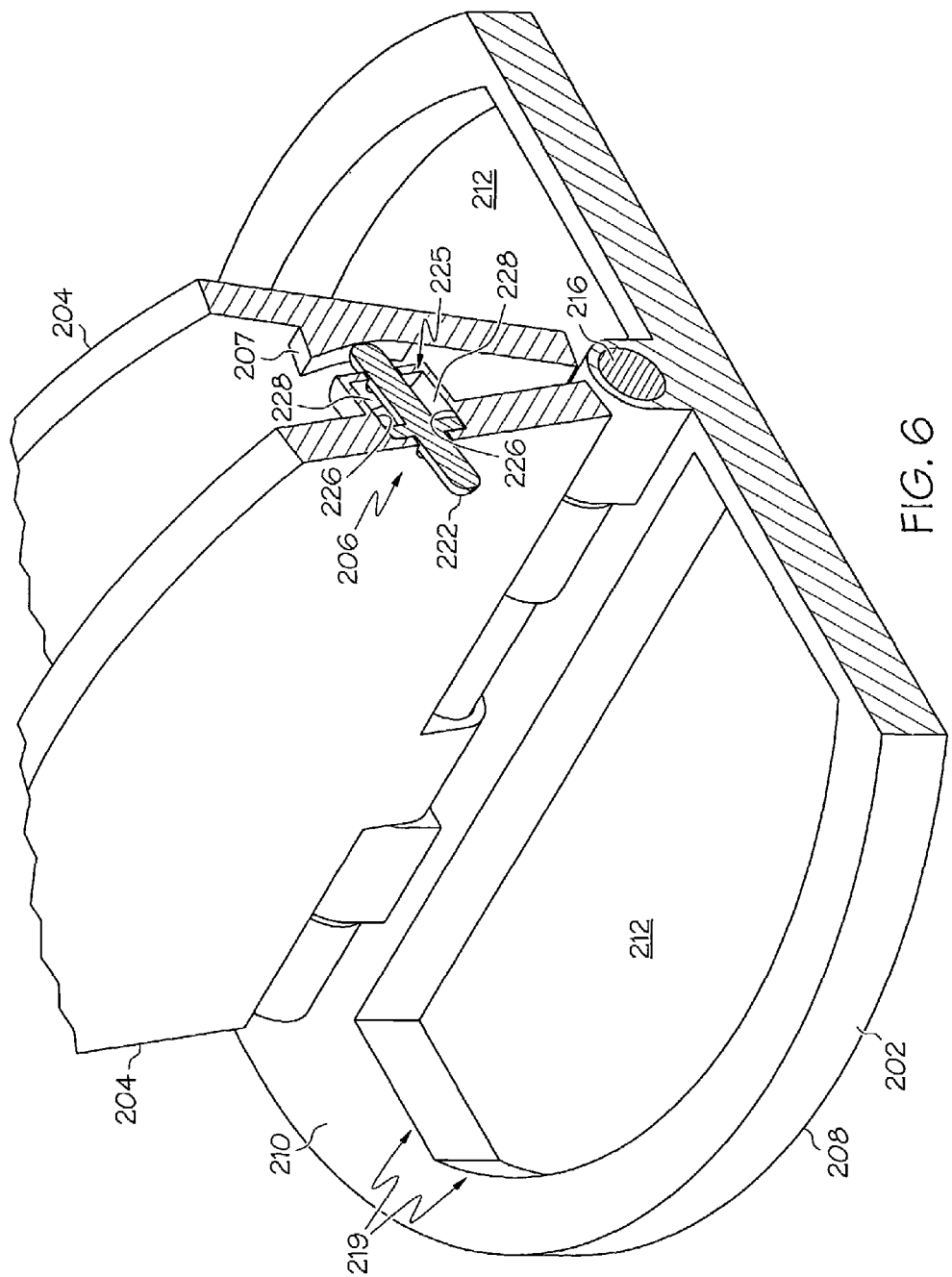
FIG. 6 provides a perspective plan view of the exemplary valve of FIG. 2, shown from a downstream side in a fully-open position, and shown with a cross section view of an exemplary damping mechanism.

Turning first to FIGS. 2-3, perspective plan views of the valve 110 are provided from the downstream side, in a closed position (FIG. 2) and a fully-open position (FIG. 3). Additionally, FIGS. 4-5 depict perspective plan views of a portion of the valve 110 as it approaches the fully-open position (FIG. 4) and the closed position (FIG. 5). The valve 110 includes a valve body 202, a pair of flappers 204, one or more damping mechanisms 206, and one or more flapper stops 207.

The valve body 202 is annular in shape and includes an upstream side 208, a downstream side 210, and a pair of flow channels 212 that extend between the upstream and downstream sides 208, 210. A plurality of hinge pins 216 couple the flappers 204 with the valve body 202.

The flappers 204 are rotationally mounted on the valve body 202, and are movable between a closed position and a fully-open position. In the closed position, the flappers 204 preferably engage a seat region 219 (depicted in FIG. 3) on the valve body 202 to seal, or at least substantially seal, a corresponding flow channel 212. In the fully-open position, or any one of numerous open positions, the flappers 204 unseal the corresponding flow channel 212. Thus, when the flappers 204 are in the closed position, fluid flow through the flow channels 212 is prevented, or at least substantially inhibited, and when the flappers 204 are in an open position, fluid flow through the flow channels 212 is allowed.

The valve 110 is preferably configured such that both flappers 204 are simultaneously in either the closed or an open position. However, as will also be described further below, this is merely exemplary of a particular embodiment, and the valve 110 could be configured such that each flapper 204 may be individually moved to an open position. Moreover, although the valve 110 is preferably implemented with a pair of flow channels 212 and an associated pair of flappers 204, it will be appreciated that the valve 110 could, in an alternative embodiment, be implemented with more or less than this number of flow channels 212 and flappers 204.

Each of the one or more damping mechanisms 206 are configured to provide damping when the flappers 204 open and close, thereby reducing wear and noise during operation of the valve 110. In the depicted split flapper valve 110, there are preferably two damping mechanisms 206 on opposite sides of the flapper valve 110, each damping mechanism 206 coupled to a separate corresponding flapper 204. However, it will be appreciated that that the number of damping mechanisms 206 may vary depending on the type of valve 110.

Figure 9:
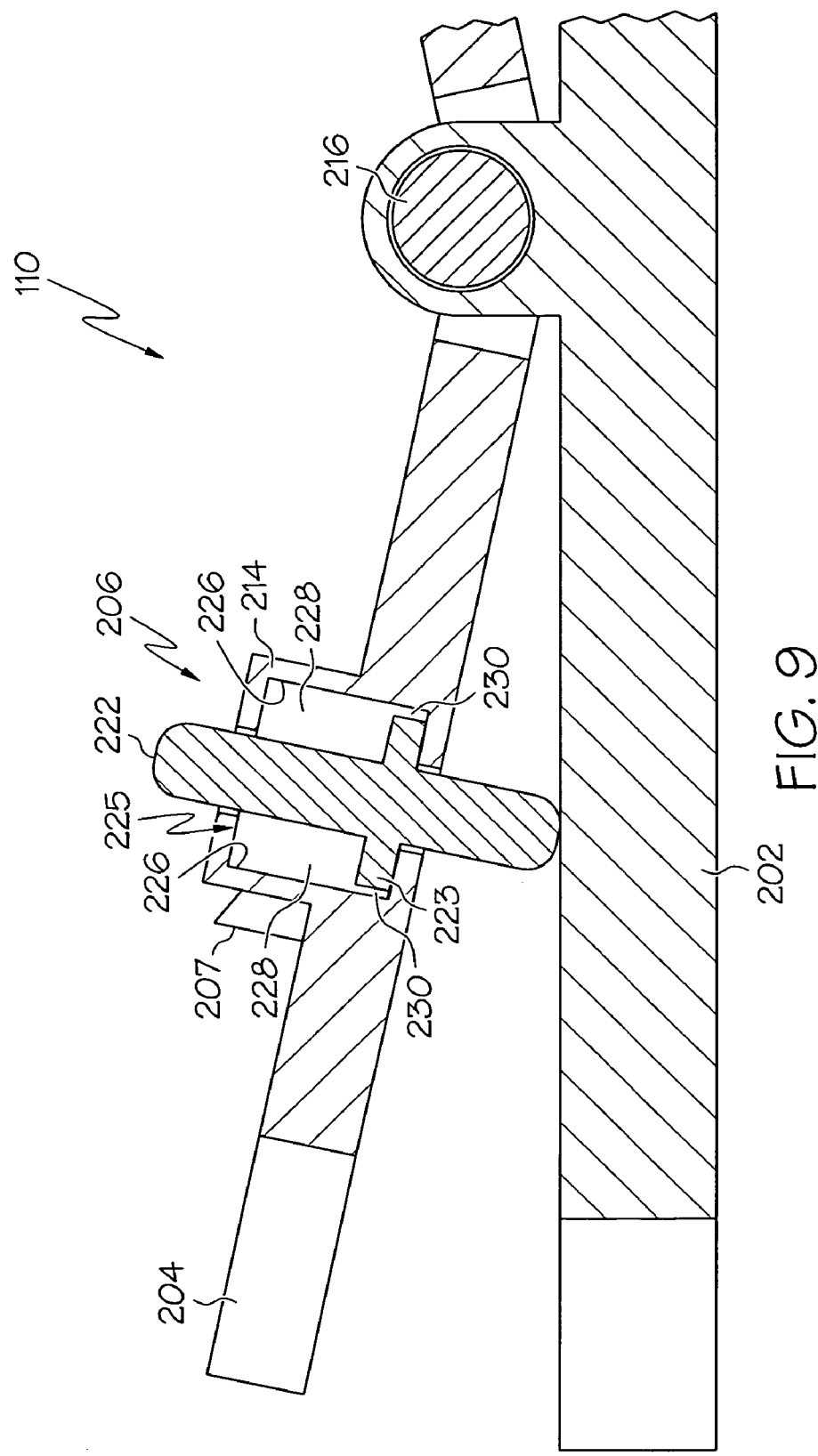
FIG. 9 provides a close-up end view of a portion of the exemplary valve of FIG. 2, shown with a cross section view of an exemplary embodiment of a damping mechanism, and shown as the valve approaches a closed position.
Figure 10:
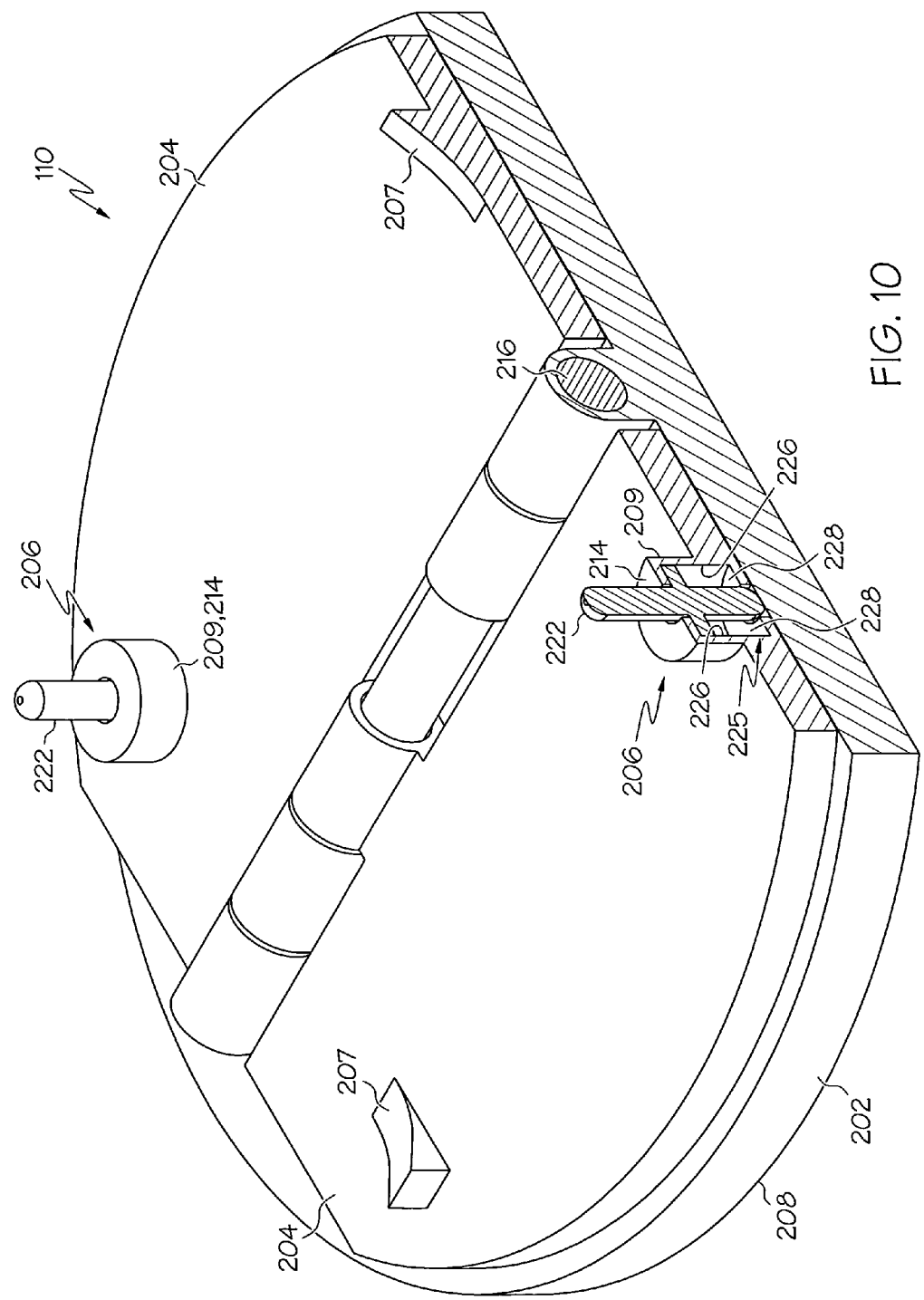
FIG. 10 provides a perspective plan view of the exemplary valve of FIG. 2, shown from a downstream side in a closed position, and shown with a cross section view of an exemplary damping mechanism.
Figure 11:
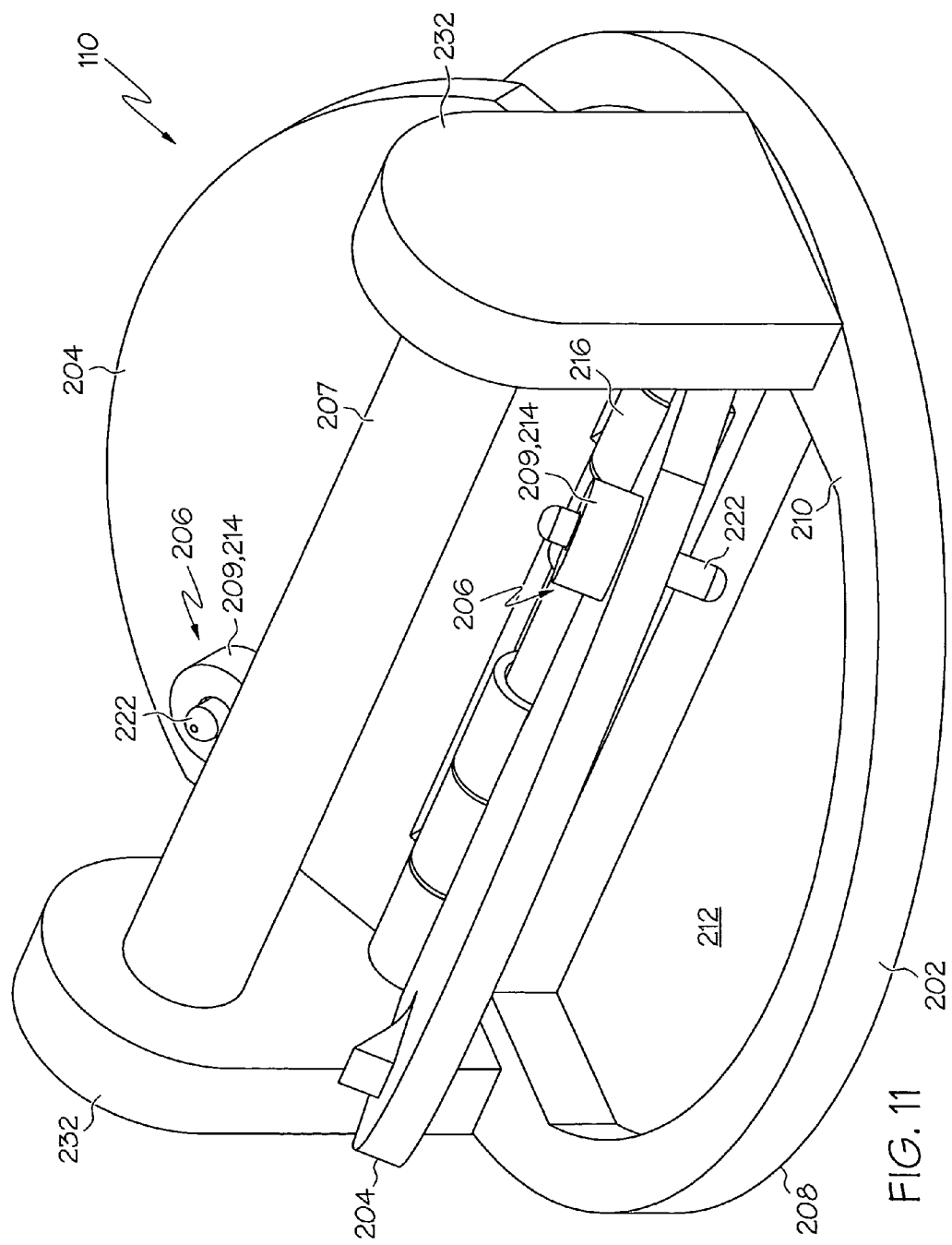
FIG. 11 provides a perspective plan view, from a downstream side and in a partially open position, of another exemplary embodiment of a check valve that may be used in the system of FIG. 1, incorporating a stop tube.

An exemplary embodiment of a damping mechanism 206 is shown in connection with the valve 110 in FIGS. 2-11, and with reference thereto will now be described in greater detail. Specifically, FIGS. 2-5 depict the damping mechanism 206 as it appears in the valve 110 with an outside wall 209, as shown when the valve 110 is in the closed position (FIG. 2) and the fully-open position (FIG. 3), and as the valve 110 approaches the fully-open position (FIG. 4) and the closed position (FIG. 5). FIGS. 6-10 depict a cross section view of one of the damping mechanisms 206 and a portion of one of the flappers 204, in order to better depict the various features of the damping mechanism 206, when the valve 110 is in the fully-open position (FIGS. 6 and 8) and the closed position (FIG. 10), and as the valve approaches the fully-open position (FIG. 7) and the closed position (FIG. 9). FIG. 11 depicts the damping mechanism 206 in a valve 110 with an alternative type of flapper stop 207, namely a stop tube, as will be described further below.

As shown in FIGS. 2-11, the one or more damping mechanisms 206 each include a main body 214 and a piston 222. In the depicted embodiment having two damping mechanisms 206, preferably each damping mechanism 206 is mounted on a different corresponding flapper 204. The main body 214 includes at least an inner wall 226, and preferably also includes an outer wall 209 as depicted in FIGS. 2-5 and 11. The damping mechanism 206 preferably also includes one or more seals 225, as depicted in FIGS. 6-10 and discussed further below.

Turning now to FIGS. 6-10, the inner wall 226 and the interior of the main body 214 are shown. The inner wall 226 defines a chamber 228 having fluid therein. The fluid contained in the chamber 228 can be air, or any one of numerous suitable types of fluid. In certain embodiments, the type of fluid may be selected based at least in part on the viscosity of the fluid, and the resulting effect on the speed of the damping for the valve 110.

The piston 222 is disposed at least partially within the chamber 228, and is configured to move within the chamber 228 in a direction opposite the direction of movement of the main body 214 when the corresponding flapper 204 approaches the fully-open position or the closed position, to thereby compress the fluid in a section of the chamber 228 and slow movement of the main body 214. Accordingly, movement of the flapper 204 is thereby slowed as the flapper 204 approaches the fully-open or closed position. In various embodiments, the shape, size, material, and/or configuration of the piston 222 can be tailored to meet the specific damping needs of the particular valve 110.

Figure 7:
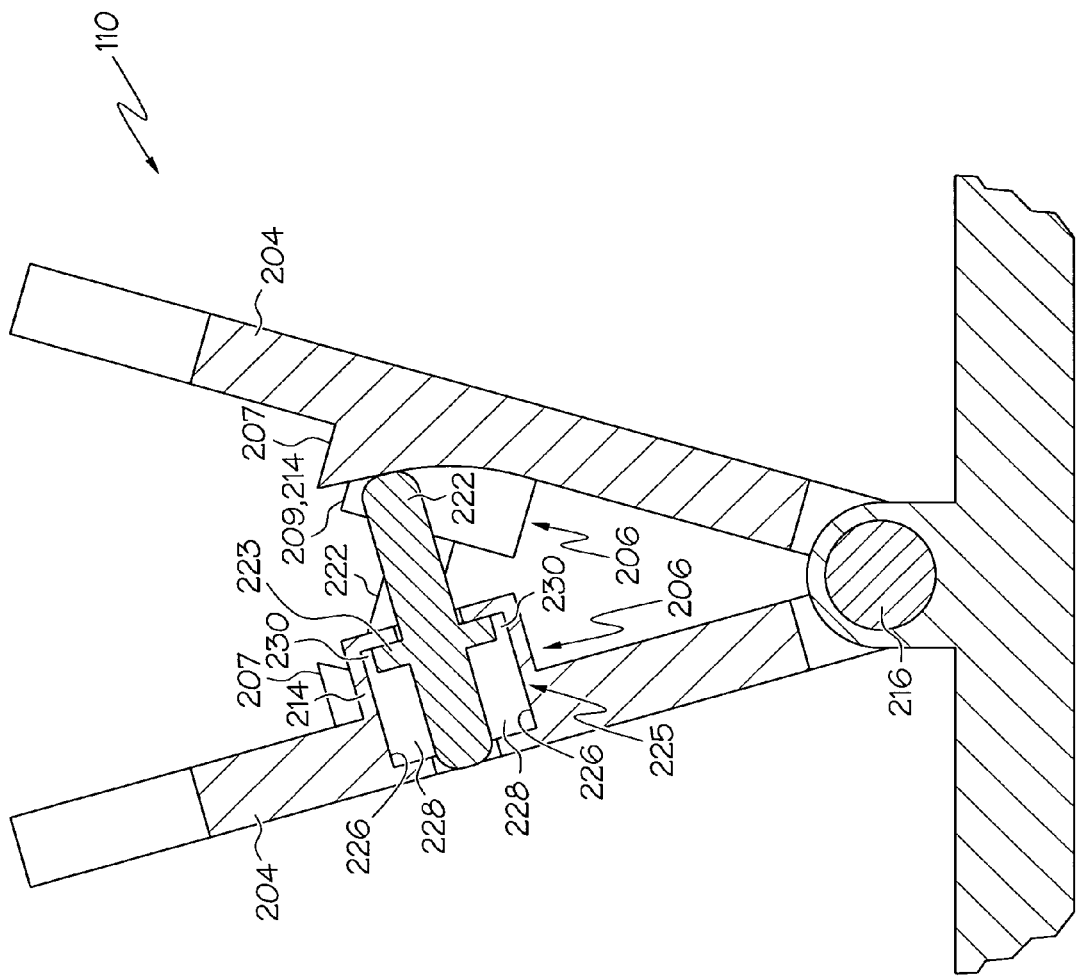
FIG. 7 provides a close-up end view of a portion of the exemplary valve of FIG. 2, shown with a cross section view of an exemplary damping mechanism, and shown as the valve approaches a fully-open position.
Figure 8:
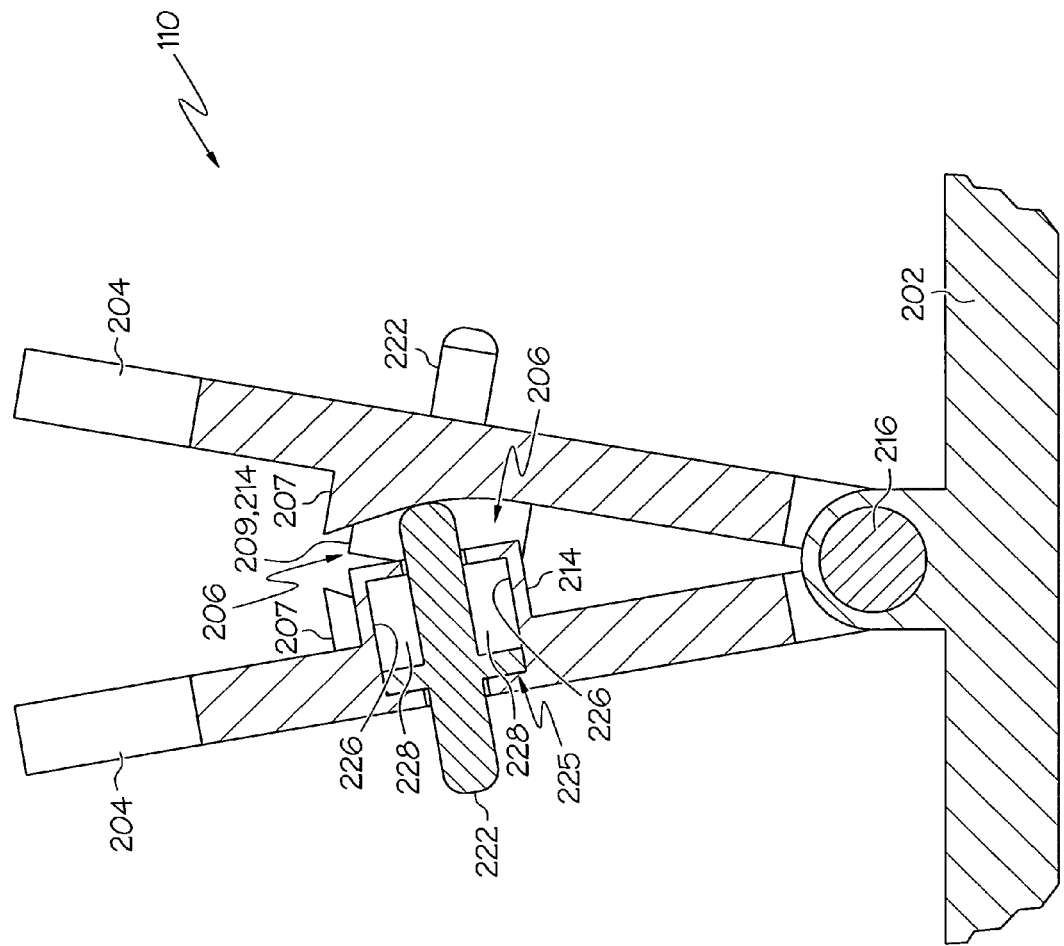
FIG. 8 provides an end view of the exemplary valve of FIG. 2 shown in a fully-open position, and shown with a cross section view of an exemplary damping mechanism.

In the depicted embodiments, the piston 222 contacts the stop 207 on the opposite flapper 204 when the flappers 204 approach the fully-open position (see FIGS. 4 and 7). The stops 207 are configured to engage the piston 222 during this time, to thereby at least facilitate movement of the piston 222 within the chamber 228 in a direction opposite the direction of movement of the main body 214. Accordingly, the piston 222 is compelled to move within the chamber 228 in a direction away from the stop 207, and opposite the direction of movement of the flapper 204 and the damping mechanism main body 214 (see FIGS. 3, 6, and 8). During this time, the piston 222 compresses the fluid in at least a section of the chamber 228, and the fluid at least partially egresses out of that same section of the chamber 228. The movement of the main body 214 and the flapper 204 are thereby slowed as the flapper 204 approaches the fully-open position.

Conversely, in the depicted embodiments the piston 222 contacts the valve body 202 when the flapper 204 approaches the closed position (see FIGS. 5 and 9). The valve body 202 is configured to engage the piston 222 during this time, to thereby at least facilitate movement of the piston 222 within the chamber 228 in a direction opposite the direction of movement of the main body 214. Accordingly, the piston 222 is compelled to move within the chamber 228 in a direction away from the valve body 202, and opposite the direction of movement of the flapper 204 and the damping mechanism main body 214 (see FIGS. 2 and 10). During this time, the piston 222 compresses the fluid in at least a section of the chamber 228, and the fluid at least partially egresses out of that same section of the chamber 228. The movement of the main body 214 and the flapper 204 are thereby slowed as the flapper 204 approaches the closed position.

Preferably, the inner wall 226 and a section 223 of the piston 222 together define a flow path 230 around the piston 222, whereby fluid can at least partially egress out of the section of the chamber 228 when compressed by the piston 222, as shown in the close-up views of FIGS. 7 and 9. Preferably, the flow path 230 is relatively small, compared to the size of the piston section 223 and the chamber 228. In certain embodiments, the fluid can at least partially egress out of the section of the chamber 228 via one or more ends of the chamber 228, in addition to or instead of through the flow path 230 around the piston section 223. Regardless of the particular embodiment, as the piston 222 compresses the fluid in the section of the chamber 228, movement of the main body 214 in the opposite direction is slowed, thereby slowing the flapper 204 as the flapper 204 approaches the fully-open or closed position.

The seals 225 are preferably disposed in one or more places in or around the damping mechanism 206, for example, surrounding the chamber 228, and help to restrict the fluid from escaping from at least the section of the chamber 228 at least when the flapper 204 is in an intermediate position before approaching the fully-open or closed position. Preferably, the seals 225 are placed where fluid intended for damping may otherwise escape unintentionally. It will be appreciated that the seals 225 may also be disposed in any one or more of numerous other locations in or around the damping mechanism 206, and that in certain embodiments seals 225 may not be needed.

As depicted in FIGS. 2-10, in one preferred embodiment the stops 207 for each damping mechanism 206 are preferably mounted on a flapper 204 other than the corresponding flapper 204. Accordingly, in this preferred embodiment, each flapper 204 preferably has, mounted on it, a corresponding damping mechanism 206, as well as a stop 207 configured to engage a piston 222 from a different damping mechanism 206 that is mounted on a different flapper 204.

In another preferred embodiment, depicted in FIG. 11, one or more stops 207 are mounted on the valve body 202. For example, in the embodiment of FIG. 11, a stop tube 208 is shown mounted to the valve 202 via a plurality of flanges 232. As shown in FIG. 11, the stop tube 208 can be configured to engage the pistons 222 of multiple damping mechanisms 206. However, it will be appreciated that the valve 110 and the damping mechanisms 206 can be implemented in connection with any one of numerous different types of stops 207, or combinations thereof. It will similarly be appreciated that in certain embodiments the valve body 202 may be used instead of or in addition to a stop 207 to engage the piston 222 when the flapper 204 approaches the fully-open position, and/or that one or more stops 207 may be used instead of or in addition to the valve body 202 to engage the piston 222 when the flapper 204 approaches the closed position.

With respect to the manufacture of the damping mechanisms 206, it will be appreciated that in certain embodiments the damping mechanism 206 may be manufactured as an integral part of a split flapper valve 110, or any one of numerous other types of valves 110. In other embodiments, the damping mechanism 206 may be manufactured separately for implementation in any one or more of numerous different types of valves 110. Similarly, it will be appreciated that the damping mechanism 206 can be used in any one of numerous different types of systems 100.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A check valve comprising:
    a valve body having an upstream side, a downstream side, and a valve flow channel that extends between the upstream and downstream sides;
    a flapper rotationally mounted on the valve body and movable between a closed position, in which the flapper at least substantially seals the valve flow channel, and an open position, in which the flapper at least substantially unseals the valve flow channel; and
    a damping mechanism mounted on the flapper and configured to slow movement of the flapper when the flapper is approaching the open position and when the flapper is approaching the closed position, the damping mechanism comprising:
        a main body having at least an inner wall that defines a chamber having fluid therein, the main body coupled to the flapper and configured to move therewith; and
        a piston disposed at least partially within the chamber, the piston configured to move within the chamber in a direction opposite the direction of movement of the main body when the flapper approaches the open position and when the flapper approaches the closed position, to thereby compress the fluid in a section of the chamber and slow movement of the main body and the flapper.

2. The check valve of claim 1, further comprising:
    one or more stops mounted on the valve body and configured to engage the piston, to thereby at least facilitate movement of the piston within the chamber in a direction opposite the direction of movement of the main body and thereby slow movement of the flapper, when the flapper approaches the open position.

3. The check valve of claim 2, wherein the one or more stops comprise a stop tube.

4. The check valve of claim 1, wherein the valve body is configured to engage the piston, to thereby at least facilitate movement of the piston within the chamber in a direction opposite the direction of movement of the main body and thereby slow movement of the flapper, when the flapper approaches the closed position.

5. The check valve of claim 1, wherein the fluid in the chamber at least partially egresses out of the section of the chamber when compressed by the piston.

6. The check valve of claim 1, wherein the inner wall defines a fluid path around at least a portion of the piston in the chamber, the fluid path configured to allow fluid to egress out of the section of the chamber when compressed by the piston.

7. The check valve of claim 1, further comprising:
one or more seals disposed within the chamber to at least substantially prevent egress of the fluid out of the section except when compressed by the piston.

8. The check valve of claim 1, further comprising:
a second flow channel that extends between the upstream and downstream sides;
a second flapper rotationally mounted on the valve body and movable between a closed position, in which the second flapper at least substantially seals the second flow channel, and an open position, in which the second flapper unseals the flow channel; and
a second damping mechanism mounted on the second flapper, the second damping mechanism comprising:
a main body having at least an inner wall that defines a chamber having fluid therein, the main body coupled to the second flapper and configured to move therewith; and
a piston disposed at least partially within the chamber, the piston configured to move within the chamber in a direction opposite the direction of movement of the main body when the second flapper approaches the open position or the closed position, to thereby compress the fluid in a section of the chamber and slow movement of the main body,
whereby movement of the second flapper is slowed when approaching the open position or the closed position.

9. The check valve of claim 8, further comprising:
a first stop coupled to the second flapper, the first stop configured to engage the damping mechanism piston, to thereby at least facilitate movement of such piston within the damping mechanism chamber in a direction opposite the direction of movement of the damping mechanism main body and thereby slow movement of the flapper, when the flapper approaches the open position; and
a second stop coupled to the flapper, the second stop configured to engage the second damping mechanism piston, to thereby at least facilitate movement of such piston within the second damping mechanism chamber in a direction opposite the direction of movement of the second damping mechanism main body and thereby slow movement of the second flapper, when the second flapper approaches the open position.

10. A check valve comprising:
a valve body having an upstream side, a downstream side, and a plurality of valve flow channels that extend between the upstream and downstream sides;
a plurality of flappers rotationally mounted on the valve body, each flapper movable between a closed position, in which such flapper at least substantially seals a valve flow channel, and an open position, in which such flapper at least substantially unseals a valve flow channel; and
a plurality of damping mechanisms, each damping mechanism mounted on a corresponding flapper and configured to slow movement of the corresponding flapper when the corresponding flapper is approaching the open position and when the corresponding flapper is approaching the closed position, each damping mechanism comprising:
a main body having at least an inner wall that defines a chamber having fluid therein, the main body coupled to the corresponding flapper and configured to move therewith; and
a piston disposed at least partially within the chamber, the piston configured to move within the chamber in a direction opposite the direction of movement of the main body when the corresponding flapper approaches the open position and when the corresponding flapper approaches the closed position, to thereby compress the fluid in a section of the chamber and slow movement of the main body and the corresponding flapper.

11. The check valve of claim 10, further comprising:
one or more stops mounted on the valve body and configured to engage each piston, to thereby at least facilitate movement of each piston within its respective chamber in a direction opposite the direction of movement of the respective main body and thereby slow movement of the corresponding flapper, when the corresponding flapper approaches the open position.

12. The check valve of claim 10, further comprising:
one more or more stops configured to engage the piston of at least one respective damping mechanism, thereby at least facilitating movement of such piston within its respective chamber in a direction opposite the direction of movement of the respective main body when the corresponding flapper approaches the open position, the one or more stops disposed on a flapper other than the corresponding flapper.

13. The check valve of claim 10, wherein the valve body is configured to engage at least one piston, to thereby at least facilitate movement of the at least one piston within its respective chamber in a direction opposite the direction of movement of the respective main body and thereby slow movement of the corresponding flapper, when the corresponding flapper approaches the closed position.

14. A damping system for a valve with a flapper movable between an open position and a closed position, the damping system comprising:
a main body having at least an inner wall that defines a chamber having fluid therein, the main body coupled to the flapper and configured to move therewith; and
a piston disposed at least partially within the chamber, and configured to slow movement of the flapper when the flapper approaches the open position and when the flapper approaches the closed position, the piston configured to move within the chamber in a direction opposite the direction of movement of the main body when the flapper approaches the open position and when the flapper approaches the closed position, to thereby compress the fluid in a section of the chamber and slow movement of the main body and the flapper.

15. The damping system of claim 14, wherein the main body is configured to be mounted on the flapper.

16. The damping system of claim 14, further comprising:
one or more stops configured to be mounted on the valve, the one or more stops further configured to engage the piston, to thereby at least facilitate movement of the piston within the chamber in a direction opposite the direction of movement of the main body and thereby slow movement of the flapper, when the flapper approaches the open position.

17. The damping system of claim 14, wherein the valve body is configured to engage the piston, to thereby at least facilitate movement of the piston within the chamber in a direction opposite the direction of movement of the main body and thereby slow movement of the flapper, when the flapper approaches the closed position.

18. The damping system of claim 14, wherein the fluid in the chamber at least partially egresses out of the section of the chamber when compressed by the piston.

19. The damping system of claim 14, wherein the inner wall defines a fluid path around at least a portion of the piston in the chamber, the fluid path configured to allow fluid to egress out of the section of the chamber when compressed by the piston.

20. The damping system of claim 14, further comprising:
one or more seals disposed within the chamber to at least substantially prevent egress of the fluid out of the section except when compressed by the piston.

* * * * *